F. R. GLASCOCK.
Pitmen.
No. 5,600. Reissued Oct. 14, 1873.
FIG. II.
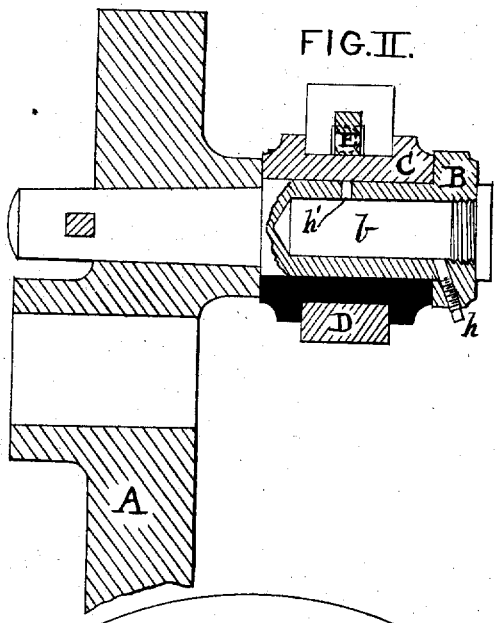
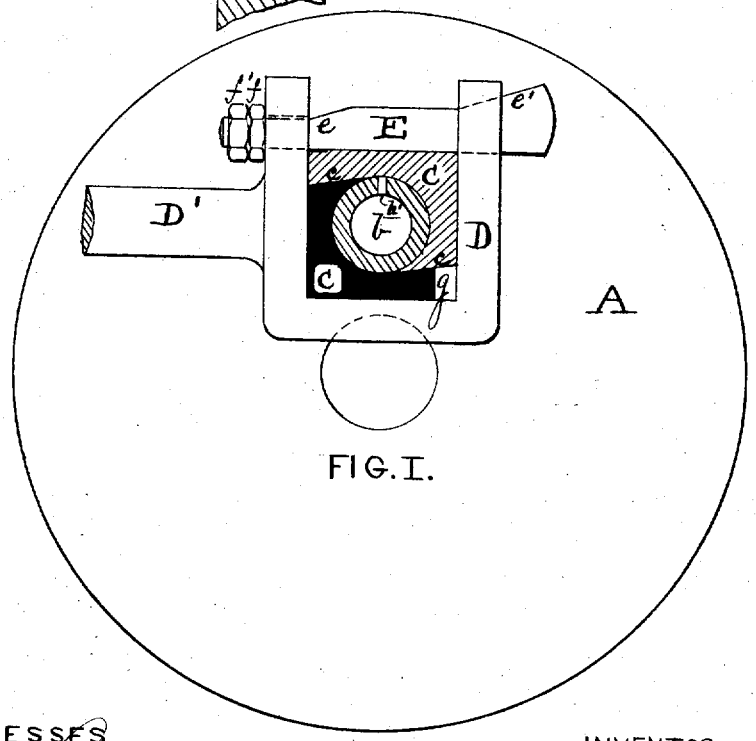
FIG. I.
WITNESSES
R. H. Whitlesey
J. b. Dowell
INVENTOR:
Frank R. Glascock,
by G. H. & W. J. Howard,
attys.
AM. PHOTO-LITHOGRAPHIC Co. N.Y. (OSBORNE'S PROCESS)

UNITED STATES PATENT OFFICE.

FRANK R. GLASCOCK, OF HILLSBOROUGH, OHIO.

IMPROVEMENT IN PITMEN.

Specification forming part of Letters Patent No. 133,581, dated December 3, 1872; reissue No. 5,600, dated October 14, 1873; application filed August 23, 1873.

*To all whom it may concern:*

Be it known that I, FRANK R. GLASCOCK, of Hillsborough, in the county of Highland and State of Ohio, have invented certain Improvements in Journals and Lubricators, of which the following is a specification; and I do hereby declare that in the same is contained a full, clear, and exact description of my said invention, reference being had to the accompanying drawing and to the letters of reference marked thereon.

My invention relates, first, to a mode of adapting the journal-boxes to be keyed or set up by the pressure of a key drawn so as to operate parallelly against one of the halves of the box, causing them to bind the pin or shaft around which they are fitted; secondly, to the combination of the said two half journal-boxes with a strap having a keying or tightening device, hereinafter fully explained; and, thirdly, my invention relates to the application of the said journal-boxes, combined with the strap having the said keying or tightening devices, to a crank or wrist pin embodying within itself a means whereby the operative parts, consisting of the pin and journal-boxes, are lubricated by oil thrown thereagainst by centrifugal force as the parts are revolved.

In the further description of my invention which follows, due reference must be had to the accompanying drawing, in which—

Figure 1 is a part sectional front view of my invention, and Fig. 2 a vertical side section of the same.

Similar letters of reference indicate similar parts of my invention in both the views.

A is the crank or crank-wheel. B is the crank or wrist pin. C C are the two halves of the journal-box, fitted around the pin B between the shoulder of the pin and that formed by the boss on the face of the crank-wheel. D is a strap, forming a part of the rod D′. As shown in Fig. 1, the two half-boxes C join together upon line *c*, which, while parallel with each other, commence tangentially with the circumference of the pin B at opposite points thereof, running therefrom at an angle with the respective sides of the boxes confined by the strap D. The angle or bevel of the lines *c* will be that best adapted to the setting up of the boxes by the means hereinafter explained. The strap D has three sides, which bear upon the same number of the sides of the journal-boxes, the other bearing being that of the key E, which has parallel sides, excepting in those parts of its length, *e e′*, where a draft is provided to operate with beveled slots cut in the respective sides of the strap for the reception of the said key.

The setting of the boxes is accomplished by the screwing up of the nut *f* placed upon the pin forming the termination of the small end of the key, this turning of the said nut drawing the key forward, moving the surface thereof bearing upon that of the upper box parallelly thereto downward toward the center of the wrist-pin. This movement of the key, as the upper box cannot slide laterally, because of its being confined between two of the inner surfaces of the strap, tends to move the said upper box downward, which, in turn, effects a lateral displacement of the lower box, room being left between the part thereof *g* and the inner surface of the strap next thereto for such lateral movement. The combined effect of the movement of the two half-boxes, which is admissible by reason either of their own wear or that of the pin, or the wear of all the operative parts, is the binding of the pin by the said journal-boxes. The lock-nut *f′* is provided for the purpose of preventing the jarring loose of the nut *f* when set up sufficiently for the purpose described.

The lubricating of the operative parts hereinbefore alluded to is effected by means constructed and arranged as follows: With a view of forming a reservoir for the oil, I drill or turn out an oil-cavity, *b*, within the wrist-pin B, parallel with its bearing-surface, or at a right angle with the face of the crank of which it forms a part. The depth and diameter of the oil-cavity *b* is such as will furnish space for the requisite amount of oil to be stored. The cavity or drill-hole is covered at the end of the pin by a suitable cap. Leading into the cavity *b* from the exterior of the wrist-pin, at that part thereof outside of the journal-boxes, is a small hole, *h*, through which the oil is poured from the oil-can. Leading from the cavity *b* under the boxes is another small hole, *h′*, through which the oil is thrown by centrifugal force when the parts are revolving between the bearing-surfaces of the boxes and pin.

The devices forming my invention are applicable to any piece of machinery whereby a mechanical movement is produced, such as that herein provided for, and the constant lubrication of which is desirable.

Having thus described my invention, what I claim as new, and wish to secure by Letters Patent of the United States, is—

1. The combination of an upper and a lower box, C, joining each other at parallel lines *c*, projected at an angle or bevel from points tangential with opposite points of the circumference of the bore, the upper box being adapted to move vertically, and the lower laterally, as set forth.

2. The journal-boxes C C, constructed as described, in combination with the strap and rod D D′, key E, and nuts *f f′*, substantially as and for the purpose herein specified.

3. The combination of the boxes C C, strap and rod D D′, with key and nuts, as set forth, with the wrist-pin B, having the oil-cavity *b* and its cap, and the oil-passages *h h′*, substantially as herein described, for the purposes specified.

In testimony whereof I have hereunto subscribed my name at Hillsborough, in the county of Highland and State of Ohio, this 28th day of February, in the year of our Lord 1873.

FRANK R. GLASCOCK.

Witnesses:

JOSEPH GLASCOCK,

H. L. MEEK.